United States Patent
Seo et al.

(10) Patent No.: US 8,166,272 B2
(45) Date of Patent: Apr. 24, 2012

(54) METHOD AND APPARATUS FOR ALLOCATION OF BUFFER

(75) Inventors: Hyung-jin Seo, Hwaseong-si (KR);
Jae-young Lee, Yongin-si (KR);
Sung-hyun Cho, Seoul (KR); Du-il Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 980 days.

(21) Appl. No.: 12/141,153

(22) Filed: Jun. 18, 2008

(65) Prior Publication Data
US 2009/0125697 A1 May 14, 2009

(30) Foreign Application Priority Data
Nov. 14, 2007 (KR) .................. 10-2007-0116150

(51) Int. Cl.
*G06F 12/02* (2006.01)
(52) U.S. Cl. .............................. 711/171; 711/147
(58) Field of Classification Search ............... None
See application file for complete search history.

(56) References Cited

U.S. PATENT DOCUMENTS

| | | | |
|---|---|---|---|
| 6,014,730 A * | 1/2000 | Ohtsu | 711/170 |
| 6,240,492 B1 * | 5/2001 | Foster et al. | 711/149 |
| 6,832,302 B1 * | 12/2004 | Fetzer et al. | 711/170 |
| 7,444,491 B1 * | 10/2008 | Steinbusch | 711/170 |
| 2003/0037178 A1 * | 2/2003 | Vessey et al. | 709/319 |
| 2003/0200410 A1 * | 10/2003 | Russo et al. | 711/170 |
| 2004/0107322 A1 * | 6/2004 | Mulligan | 711/147 |
| 2005/0102485 A1 * | 5/2005 | Koguchi et al. | 711/202 |
| 2007/0113039 A1 * | 5/2007 | Madhavarao et al. | 711/170 |
| 2008/0147213 A1 * | 6/2008 | Omiya et al. | 700/94 |
| 2008/0244118 A1 * | 10/2008 | Accapadi et al. | 710/56 |
| 2008/0244328 A1 * | 10/2008 | Bohizic et al. | 714/45 |

* cited by examiner

*Primary Examiner* — Kaushikkumar Patel
(74) *Attorney, Agent, or Firm* — Sughrue Mion, PLLC

(57) ABSTRACT

Provided are a method and apparatus for allocating a storage space that is to be used by a plurality of modules sequentially processing data. The method includes acquiring first capacity information regarding the capacity of a storage space needed for data processing of a first module and second capacity information regarding the capacity of a storage space needed for data processing of a second module that processes data consecutively to the first module, and allocating a first storage space to be used by both the first module and the second module based on at least one of the first capacity information and the second capacity information.

20 Claims, 5 Drawing Sheets

A: BUFFER USED BY FIRST MODULE
B: BUFFER USED BY SECOND MODULE
F-1, F-2, F-3: SPACE IN WHICH DATA IS STORED
N-1, N-2: SPACE IN WHICH NO DATA IS STORED

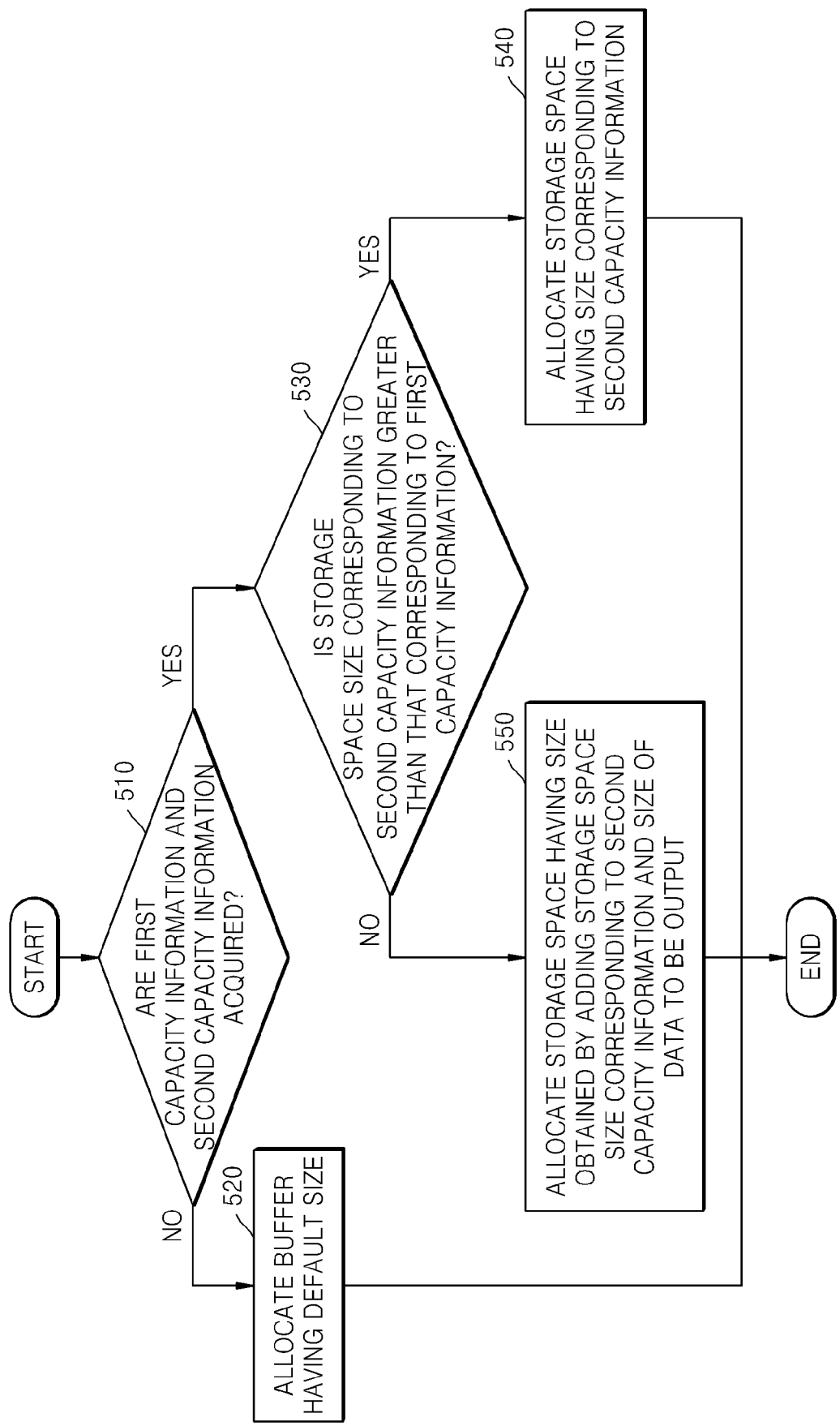

METHOD AND APPARATUS FOR ALLOCATION OF BUFFER

CROSS-REFERENCE TO RELATED PATENT APPLICATION

This application claims the benefit of Korean Patent Application No. 10-2007-0116150, filed on Nov. 14, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to an allocation of a buffer, and more particularly, to a method and apparatus for allocating a buffer that is to be used by a plurality of modules sequentially processing data.

2. Description of the Related Art

Currently, the development of Internet communication has increased the types and numbers of data. Accordingly, the types and numbers of programs for processing data have also increased. However, since different programs had to be developed even when data having a similar format or type is processed, resources were unnecessarily wasted. In order to solve this problem, a pipe and filter architecture is preferred to process the data.

The pipe and filter architecture is used to process specific data by combining independent modules that are named components or filters. An example of using the pipe and filter architecture is the processing of MP3 music files. In this case, an MP3 file can be reproduced by combining an input module, an MP3 decoding module, and an output module.

In more detail, the input module reads MP3 data that is to be reproduced.

The MP3 decoding module generates pulse coded modulation (PCM) data by applying an MP3 decoding algorithm to the read MP3 data.

The output module outputs the generated PCM data as sound through a speaker, thereby completing the processing of the MP3 data.

As described above, by processing data using the pipe and filter architecture, modules can be reused, and by combining a plurality of modules, various types of data can be processed. However, since each of a plurality of modules for processing data operates independently, one of the modules processes the data, the processing result is transferred to another module, and another module processes the received data, and thus, this may be inefficient when an interaction between modules, such as allocation of a buffer, is needed. That is, since each module is independent, any one module cannot know information regarding previous and subsequent modules, and in particularly, since buffer allocation methods applied to respective modules are different from each other, several negotiation processes between previous and subsequent modules are needed in a buffer allocation.

FIG. 1 illustrates a buffer allocation needed to process data in a conventional pipe and filter architecture.

Referring to FIG. 1, in order to process the data, a first module 101 and a second module 102 are sequentially used.

When the first module 101 allocates a buffer to be used, the first module 101 receives from the second module 102 second capacity information regarding a buffer capacity needed for the second module 102 to process the data. The first module 101 checks if the second capacity information received from the second module 102 can be transposed with first capacity information regarding the capacity of a storage space needed for data processing in the first module 101. If the first capacity information can be transposed with the second capacity information, the first module 101 allocates a buffer by using only the first capacity information and informs the second module 102 of this buffer allocation. However, if the first capacity information cannot be transposed with the second capacity information, a separate job is needed to allocate an appropriate size of a buffer to be used by the first module 101, and the first module 101 and the second module 102 must perform a complex buffer allocation process for the job, and this is called a buffer negotiation process.

For example, when the first module 101 outputs data in a unit of 1000 bytes whereas the second module 102 must input data in a unit of 2000 bytes, the first capacity information may not be transposed with the second capacity information. Thus, the first module 101 must perform a complex buffer negotiation process in order to allocate an appropriate size of a buffer.

A method of allocating a buffer to be used by the first module 101 and the second module 102 will now be described.

In general, sections of a buffer 100, in which data is stored, are discontinuous. When the buffer 100 is initially used, since data is stored from the beginning of the buffer 100, the data is continuously stored in the beginning portion of the buffer 100, and no data is stored in the last portion of the buffer 100. Thereafter, portions in which data is stored and portions in which no data is stored appear discontinuously in the buffer 100 due to operations, such as discontinuous deletion of data.

The first module 101 allocates a buffer space needed for data processing thereof. Referring to FIG. 1, an A buffer space 110 is allocated as a storage space needed for the data processing in the first module 101.

The second module 102 allocates a buffer space needed for data processing thereof. Referring to FIG. 1, since a storage space needed for the data processing in the second module 102 is greater than an N−1 buffer space 131, the second module 102 cannot allocate the N−1 buffer space 131. Thus, a B buffer space 120 is allocated as the storage space needed for the data processing in the second module 102.

In a conventional buffer allocation method, the A buffer space 110 used by the first module 101 and the B buffer space 120 used by the second module 102 are discontinuously distributed. When a buffer is allocated using this method, the following problems may occur.

First, since the conventional buffer allocation method uses a buffer scatteredly, it is inconvenient to manage the buffer.

Second, according to the conventional buffer allocation method, a data processing result of the first module 101 is stored in the A buffer space 110. Since the second module 102 processes data consecutively after the first module 101, the second module 102 needs data stored in the A buffer space 110. Thus, the data stored in the A buffer space 110 must be copied to the B buffer space 120, and since this data copy delays a data processing time, it is inefficient.

Third, according to the conventional buffer allocation method, the A buffer space 110 can be allocated as a maximum size so that data processed by the first module 101 can be smoothly stored. Thus, in most cases, the first module 101 does not use a portion of the A buffer space 110. Due to this, a buffer space is unnecessarily wasted.

Fourth, in order to overcome a problem that a buffer space is unnecessarily wasted, the A buffer space 110 can be allocated as a proper size (for example, an average value) not a maximum size. In this case, if a size of data processed by the first module 101 is greater than the A buffer space 110, a problem occurs. If a size of data processed by the first module 101 is greater than the A buffer space 110, the processed data cannot be immediately stored in the A buffer space 110. That is, if data previously stored in the A buffer space 110 is used by the second module 102, the previously stored data must be deleted and the data processed by the first module 101 must be stored. Thus, data processing of the first module 101 is delayed.

SUMMARY OF THE INVENTION

The present invention provides a storage space allocation method and apparatus for a plurality of modules sequentially processing data, so as to efficiently allocate a buffer space.

According to an aspect of the present invention, there is provided a method of allocating a storage space to be used by a plurality of modules sequentially processing data, the method comprising: acquiring first capacity information regarding the capacity of a storage space needed for data processing of a first module and second capacity information regarding the capacity of a storage space needed for data processing of a second module that processes data consecutively after the first module; and allocating a first storage space to be used by both the first module and the second module based on at least one of the first capacity information and the second capacity information.

The acquiring may further comprise acquiring third capacity information regarding the capacity of a storage space needed for data processing of a third module that processes data consecutively after the second module, the allocating may further comprise allocating a second storage space, which is to be used by both the second module and the third module, consecutively after the first storage space based on at least one of the second capacity information and the third capacity information, and the method may further comprise, if the capacity of the first storage space is insufficient, expanding the first storage space by using a portion of the second storage space, and if a spare space occurs in the first storage space, expanding the second storage space by using the spare space.

The allocating may comprise, if a storage space size corresponding to the second capacity information is greater than a storage space size corresponding to the first capacity information, allocating a storage space having the storage space size corresponding to the second capacity information as the first storage space.

The allocating may comprise, if a storage space size corresponding to the second capacity information is less than a storage space size corresponding to the first capacity information, allocating a storage space obtained by adding the storage space size corresponding to the second capacity information and a data size to be output from the first module as the first storage space.

The method may further comprise generating at least one of a first pointer pointing to a position in the first storage space in which data to be used by the first module is stored, a second pointer pointing to a position in the first storage space in which data processed by the first module is stored, a third pointer pointing to a position in the first storage space in which data to be used by the second module is stored, and a fourth pointer pointing to a position in the first storage space in which data processed by the second module is stored.

The storage space may be a circular buffer such that, if the first storage space is fully used, data is stored from the beginning of the first storage space.

The first capacity information may be information regarding a size and number of data output from the first module, and the second capacity information may be information regarding a size and number of data input to the second module.

According to another aspect of the present invention, there is provided an apparatus for allocating a storage space to be used by a plurality of modules sequentially processing data, the apparatus comprising: an information acquisition unit acquiring first capacity information regarding the capacity of a storage space needed for data processing of a first module and second capacity information regarding the capacity of a storage space needed for data processing of a second module that processes data consecutively after the first module; and a storage space allocator allocating a first storage space to be used by both the first module and the second module based on at least one of the first capacity information and the second capacity information.

BRIEF DESCRIPTION OF THE DRAWINGS

The above and other features of the present invention will become more apparent by describing in detail exemplary embodiments thereof with reference to the attached drawings in which:

FIG. 5 is a detailed flowchart illustrating the storage space allocation method of FIG. 4.

DETAILED DESCRIPTION OF THE INVENTION

The present invention will be described in detail by explaining embodiments of the invention with reference to the attached drawings.

Figure 1:
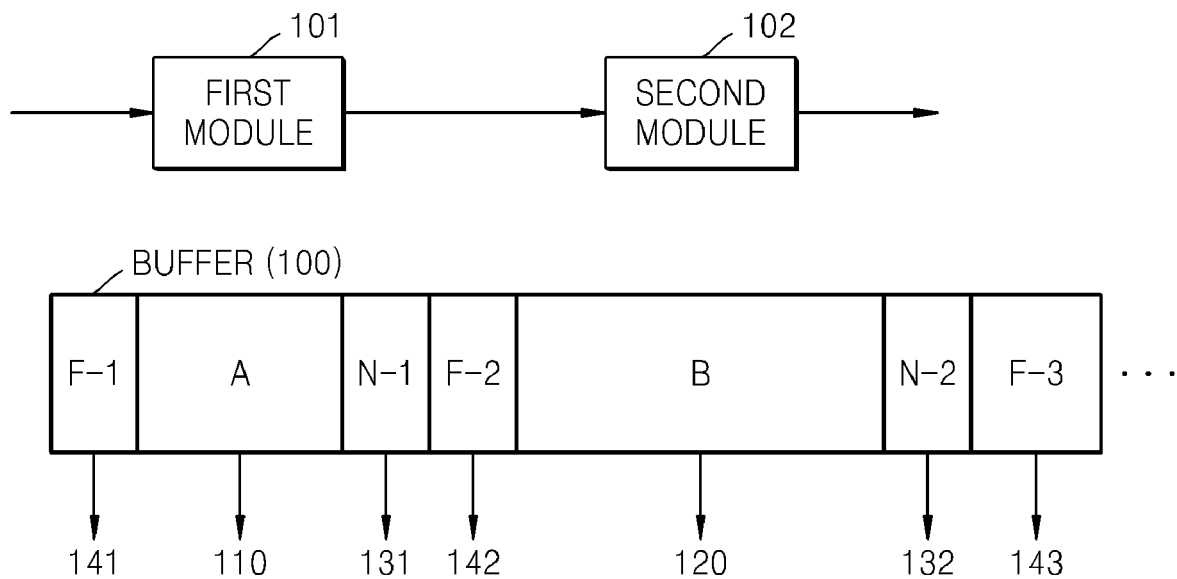
FIG. 1 illustrates a buffer allocation needed to process data in a conventional pipe and filter architecture.
Figure 2:
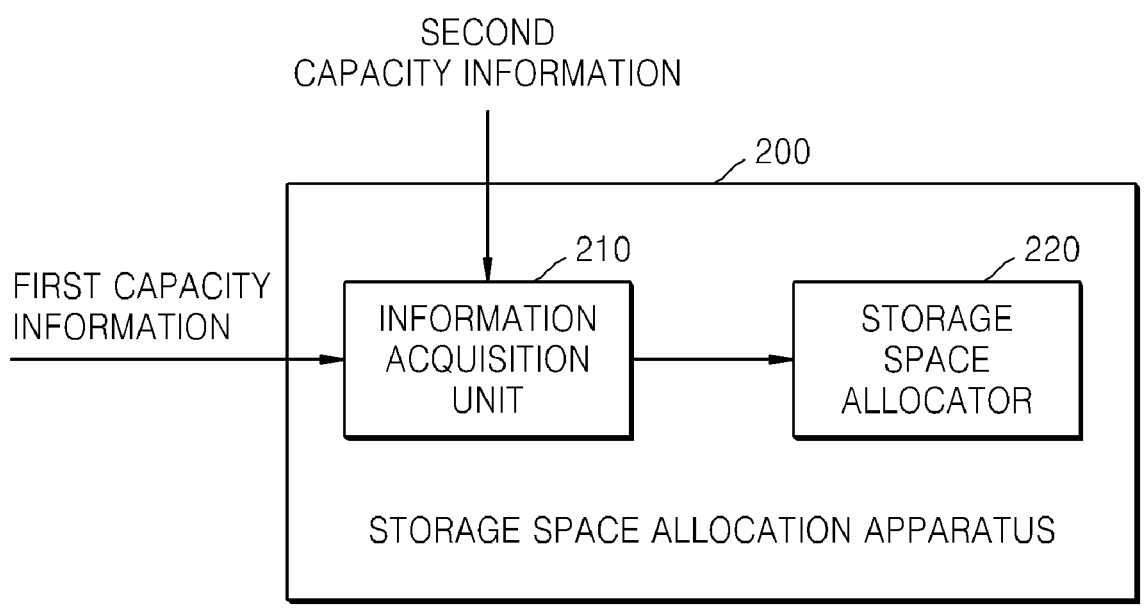
FIG. 2 is a block diagram of a storage space allocation apparatus according to an embodiment of the present invention.

FIG. 2 is a block diagram of a storage space allocation apparatus 200 according to an embodiment of the present invention.

The storage space allocation apparatus 200, according to the current embodiment of the present invention, is used to allocate a storage space to be used by a plurality of modules sequentially processing data, and includes an information acquisition unit 210 and a storage space allocator 220.

The information acquisition unit 210 acquires first capacity information regarding the capacity of a storage space needed for data processing of a first module and second capacity information regarding the capacity of a storage space needed for data processing of a second module. Herein, the second module processes data consecutively after the first module. The first capacity information can be acquired from the first module, and the second capacity information can be acquired from the second module.

If the first capacity information and the second capacity information indicate the capacity of a storage space needed for data processing in the first module and the second module, respectively, any format can be used. For example, the first capacity information may be information regarding a size and number of data output from the first module, and the second capacity information may be information regarding a size and number of data input to the second module. In an exemplary embodiment, a size of data indicates a size of unit data output from or input to each module, and number information indicates a number of corresponding unit data. That is, a module having capacity information wherein a size of unit data is 1,000 bytes and number information is 3 must allocate a storage space of 3,000 bytes.

The storage space allocator 220 allocates a first storage space to be used by both the first module and the second module based on at least one of the first capacity information and the second capacity information. The storage space allocation apparatus 200 according to the current embodiment allocates a space for storing data, such as a memory, a register, or a buffer. The storage space may be a circular buffer such that, if the first storage space is fully used, data is stored from the beginning of the first storage space.

The storage space allocation apparatus 200 can further include a pointer generator (not shown) that generates at least one of a first pointer pointing to a position in the first storage space in which data to be used by the first module is stored, a second pointer pointing to a position in the first storage space in which data processed by the first module is stored, a third pointer pointing to a position in the first storage space in which data to be used by the second module is stored, and a fourth pointer pointing to a position in the first storage space in which data processed by the second module is stored. In particular, if a position in which data to be processed is stored and a position in which processed data is stored are not constant such that the storage space is a circular buffer, a position from which data is read or a position in which data is stored can be determined by using the pointers generated by the pointer generator.

The storage space allocator 220 determines a size of the first storage space to be shared by the first module and the second module and allocates the first storage space having the determined size.

The storage space allocator 220 can determine the size of the first storage space using various methods.

One method of determining the size of the first storage space by the storage space allocator 220 is to determine the size of the first storage space prior to the second capacity information. If a storage space size corresponding to the second capacity information is greater than a storage space size corresponding to the first capacity information, a storage space having the storage space size corresponding to the second capacity information is allocated as the first storage space. For example, if the storage space size corresponding to the first capacity information is 3,000 bytes and the storage space size corresponding to the second capacity information is 6,000 bytes, the size of the first storage space is determined as 6,000 bytes.

If the storage space size corresponding to the second capacity information is less than the storage space size corresponding to the first capacity information, a storage space obtained by adding the storage space size corresponding to the second capacity information and a size of unit data to be output from the first module is allocated as the first storage space. For example, by assuming that a size of unit data contained in the first capacity information is 3,000 bytes, its number information is 2, and a size of unit data contained in the second capacity information is 1,000 bytes, and its number information is 2, and 5,000 bytes obtained by adding 2,000 bytes, which correspond to the storage space size corresponding to the second capacity information, and 3,000 bytes, which correspond to the size of unit data contained in the first capacity information, are allocated as the first storage space. This is in order for data processed by the first module to be used by the second module at least once without piling data after the processed data is stored in the first storage space.

Another method of determining the size of the first storage space by the storage space allocator 220 is to allocate a size obtained by adding the storage space size corresponding to the first capacity information and the storage space size corresponding to the second capacity information as the size of the first storage space. For example, if the storage space size corresponding to the first capacity information is 3,000 bytes and the storage space size corresponding to the second capacity information is 6,000 bytes, 9,000 bytes are determined as the size of the first storage space. If the size of the first storage space is determined by using this method, even though a large storage space is used, since data piling does not occur, data processing speed can be increased.

The above-described methods of determining the size of the first storage space are only examples, and in such cases, the size of the first storage space is determined constant without consideration of the first capacity information and the second capacity information or determined based on the first capacity information.

The storage space allocator 220 can allocate the first storage space using various methods.

One method of allocating the first storage space by the storage space allocator 220 is to allocate the first storage space as a storage space to be shared by the first module and the second module and simultaneously pre-set an area to be used by the first module and an area to be used by the second module in the first storage space. In this case, if the first module does not fully use the area allocated thereto, the second module stores data consecutively after the area used by the first module. Thus, the second module can expand to more of a storage space than the area pre-set thereto.

On the contrary, if the first module tries to use the first storage space by exceeding the area pre-set thereto, the first module uses a portion of the area to be used by the second module. Thus, the first module can expand to more of a storage space than the area pre-set thereto. In this case, an additional condition, such as that 'the first module can use the storage space to be used by the second module within 50%', can be further added.

Another method of allocating the first storage space by the storage space allocator 220 is to allocate the first storage space without distinguishing an area to be used by the first module from an area to be used by the second module. In this case, the first module sequentially stores data from the beginning of the first storage space, and the second module can continuously store data to an area remaining from the use of the first module.

In addition, the storage space allocation apparatus 200 can be applied to more than three modules. In order for the storage space allocator 220 to allocate a storage space to be shared by more than three modules, the information acquisition unit 210 further acquires third capacity information regarding the capacity of a storage space needed for data processing of a third module. The third module processes data consecutively after the second module.

There are various methods of allocating a storage space to be shared by the first module, the second module, and the third module by the storage space allocator 220.

For example, the storage space allocator 220 can allocate a storage space to be shared by the first module, the second module, and the third module, and simultaneously pre-set areas to be respectively used by the first module, the second module, and the third module in the allocated storage space. For another example, when an area to be shared by the first module, the second module, and the third module is allocated, the areas to be respectively used by the first module, the second module, and the third module are not pre-set. In the latter case, the first module sequentially stores data from the beginning of the first storage space, the second module sequentially stores data in an area remaining from the use of the first module, and the third module sequentially stores data in an area remaining from the use of the first module and the second module.

In addition, the storage space allocator 220 may sequentially allocate the first storage space to be shared by the first module and the second module, and a second storage space to be shared by the second module and the third module. In this case, the storage space allocator 220 further allocates the second storage space to be used by both the second module and the third module consecutively after the first storage space based on at least one of the second capacity information and third capacity information.

If the second storage space to be shared by the second module and the third module is continuously allocated consecutively after the first storage space to be shared by the first module and the second module, the first storage space and the second storage space are physically separated. However, by further including a storage space adjustment unit (not shown), sizes of the first storage space and the second storage space can be flexibly adjusted. That is, the storage space adjustment unit can expand the first storage space using a portion of the second storage space if the capacity of the first storage space is insufficient, and expand the second storage space using a spare space of the first storage space if the spare space occurs.

Figure 3:
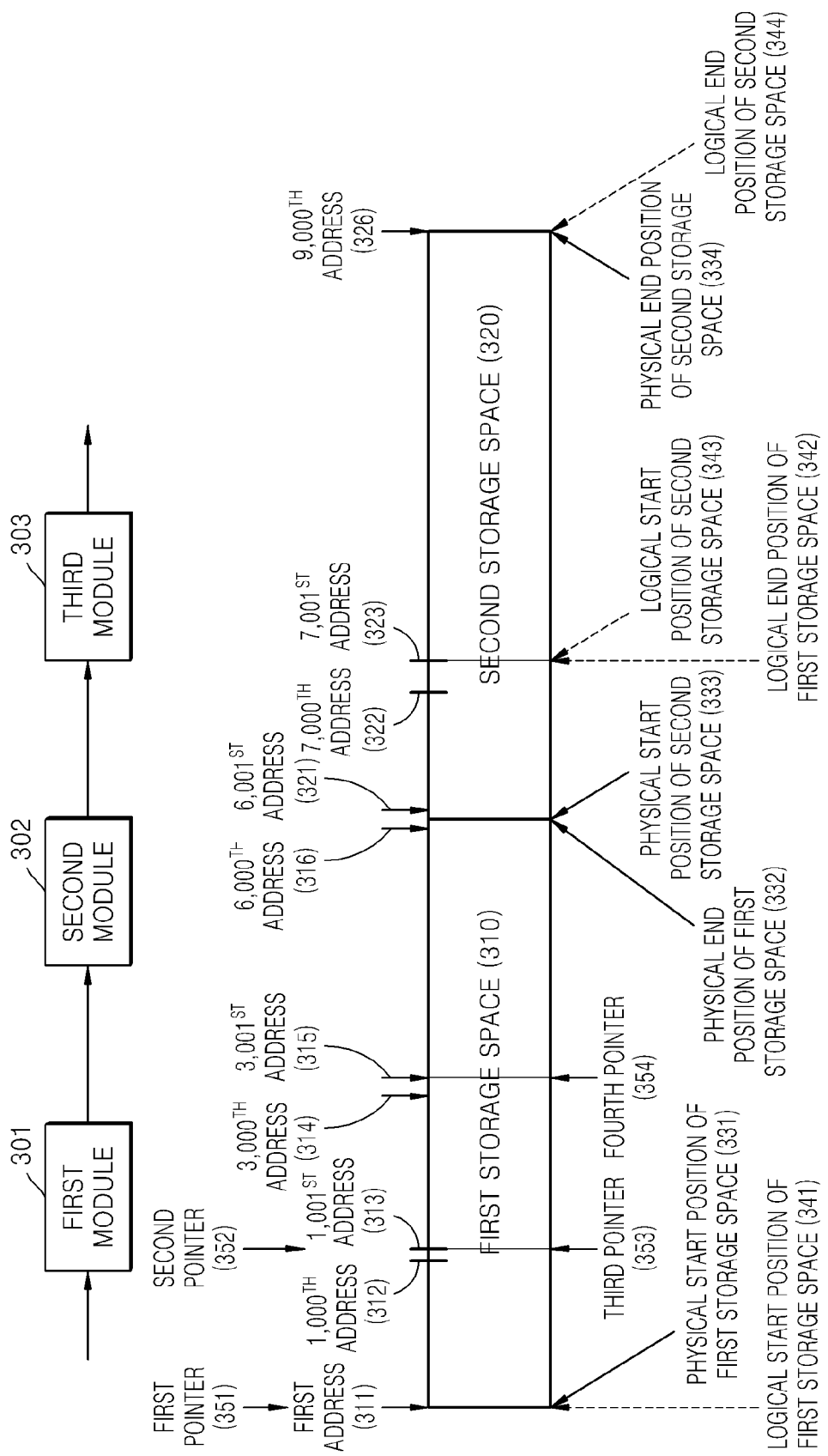
FIG. 3 illustrates allocation of a storage space and the use of the allocated storage space, according to an embodiment of the present invention.

FIG. 3 illustrates allocation of a storage space and the use of the allocated storage space, according to an embodiment of the present invention.

In the current embodiment, it is assumed that a first module 301, a second module 302, and a third module 303 are used to process MP3 data. The MP3 data is input to the first module 301, the second module 302 generates pulse coded modulation (PCM) data by processing the MP3 data, and the third module 303 outputs the generated PCM data as sound through a speaker.

The storage space allocation apparatus 200 acquires first capacity information, second capacity information, and third capacity information needed for data processing of respective modules from the first module 301, the second module 302, and the third module 303. The storage space allocation apparatus 200 allocates a first storage space 310 to be shared by the first module 301 and the second module 302, and a second storage space 320 to be shared by the second module 302 and the third module 303 by using the acquired capacity information. In the current embodiment, the storage space allocation apparatus 200 allocates 6,000 bytes as the first storage space 310 and consecutive 3,000 bytes as the second storage space 320. In addition, it is assumed that areas to be used by the first module 301 and the second module 302 are not distinguished from each other in the first storage space 310, and the first storage space 310 and the second storage space 320 are physically distinguished from each other.

Thus, addresses from a first address 311 to a 6,000th address 316 are allocated as the first storage space 310, and addresses from a 6,001st address 321 to a 9,000th address 326 are allocated as the second storage space 320. In this case, a physical start position 331 of the first storage space 310 is the first address 311, and a physical end position 332 of the first storage space 310 is the 6,000th address 316. Likewise, a physical start position 333 of the second storage space 320 is the 6,001st address 321, and a physical end position 334 of the second storage space 320 is the 9,000th address 326.

The first module 301 stores data to be processed from the first address 311 to a 1,000th address 312. Thereafter, the first module 301 processes the data by using data stored in a position indicated by a first pointer 351, and stores the processed data in a position indicated by a second pointer 352. Thus, the data processed by the first module 301 is stored from a 1,001st address 313 to a 3,000th address 314.

The second module 302 processes data by using data stored in a position indicated by a third pointer 353, and stores the processed data in a position indicated by a fourth pointer 354. Thus, the data processed by the second module 302 is stored from a 3,001st address 315. However, if it is assumed that the data processed by the second module 302 is 4,000 bytes, a space to store the processed data is insufficient. In this case, the processed data can be stored from the first address 311 by implementing the first storage space 310 using a circular buffer, otherwise the processed data can be stored by exceeding the physical end position 332 of the first storage space 310. In the latter case, the data processed by the second module 302 is stored from the 3,001st address 315 to a 7,000th address 322.

In the present specification, the first pointer 351 and the third pointer 353 are reading pointers pointing to respective address spaces in which data to be read by the first module 301 and the second module 302 is stored. In addition, the second pointer 352 and the fourth pointer 354 are writing pointers pointing to respective address spaces in which data processed by the first module 301 and the second module 302 is stored.

The third module 303 can process the data stored from the 3,001st address 315 to the 7,000th address 322 by using a separate reading pointer (not shown) and store the processed data from a 7,001st address 323. However, without the separate reading pointer, the data that must be processed by the third module 303 may be copied to the 7,001st address 323 and then the copied data may be used. In any case, the third module 303 uses a storage space from the 7,001st address 323. Thus, a logical end position 342 of the first storage space 310 becomes the 7,000th address 322, and a logical start position 343 of the second storage space 320 becomes the 7,001st address 323. As described above, the storage space allocation apparatus 200 can flexibly use a storage space by setting a logical start position and a logical end position respectively exceeding a physical start position and a physical end position of each module.

Figure 4:
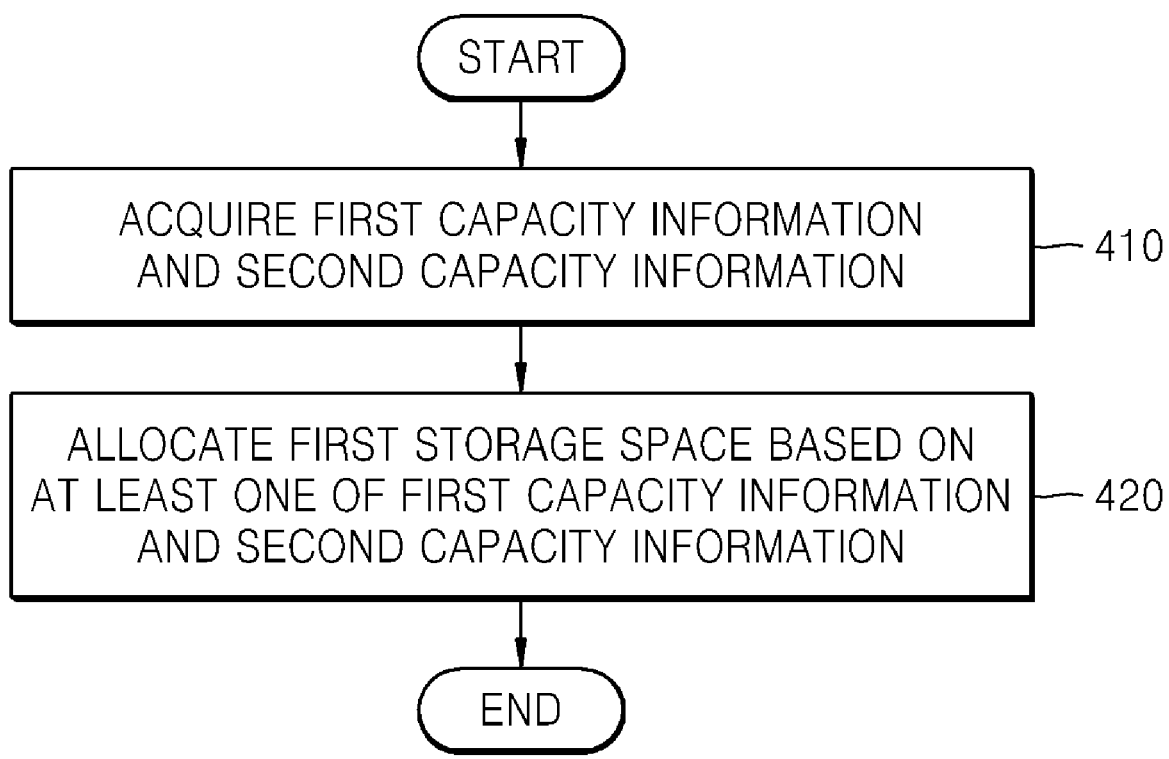
FIG. 4 is a flowchart illustrating a storage space allocation method according to an embodiment of the present invention.

FIG. 4 is a flowchart illustrating a storage space allocation method according to an embodiment of the present invention.

The storage space allocation method according to the current embodiment of the present invention can be applied when a plurality of modules sequentially processing data allocate a storage space to be used thereby.

In operation 410, first capacity information regarding the capacity of a storage space needed for data processing of a first module and second capacity information regarding the capacity of a storage space needed for data processing of a second module are acquired. In this case, the first capacity information may be the size and number information of unit data output from the first module, and the second capacity information may be the size and number information of unit data input to the second module.

In operation 420, a first storage space to be used by both the first module and the second module is allocated based on at least one of the first capacity information and the second capacity information.

In this case, when the first storage space is allocated, if a storage space size corresponding to the second capacity information is greater than a storage space size corresponding to the first capacity information, a storage space having the storage space size corresponding to the second capacity information is allocated as the first storage space. On the contrary, if the storage space size corresponding to the second capacity information is less than the storage space size corresponding to the first capacity information, a storage space obtained by adding the storage space size corresponding to the second capacity information and a data size to be output from the first module is allocated as the first storage space.

The storage space allocated by using the storage space allocation method according to the current embodiment may be a circular buffer such that, if the first storage space is fully used, data is stored from the beginning of the first storage space. In the case of the circular buffer, the storage space allocation method according to the current embodiment may further comprise generating pointers for pointing to positions in which data to be used by the first module and the second module is stored or positions in which data processed by the first module and the second module is stored.

For example, at least one of a first pointer pointing to a position in the first storage space in which data to be used by the first module is stored, a second pointer pointing to a position in the first storage space in which data processed by the first module is stored, a third pointer pointing to a position in the first storage space in which data to be used by the second module is stored, and a fourth pointer pointing to a position in the first storage space in which data processed by the second module is stored is generated.

In addition, the storage space allocation method according to the current embodiment of the present invention can allocate a storage space to be used by more than three modules, such as the first module, the second module, and a third module. In this case, in operation 410, third capacity information regarding the capacity of a storage space needed for data processing of the third module processing data consecutively after the second module is further acquired, and in operation 420, a second storage space that is to be used by both the second module and the third module is allocated consecutively after the first storage space based on at least one of the second capacity information and the third capacity information. By doing this, the first storage space to be shared by the first module and the second module and the second storage space to be shared by the second module and the third module are consecutively allocated, and if the capacity of the first storage space is insufficient, the first storage space is expanded by using a portion of the second storage space, and if a spare space occurs in the first storage space, the second storage space is expanded by using the spare space. Thus, the storage space can be efficiently used.

FIG. 5 is a detailed flowchart illustrating the storage space allocation method of FIG. 4. In FIG. 5, a storage space to be shared by the first module and the second module consecutively processing data is allocated.

In operation 510, it is determined whether information regarding the capacity of the storage space needed for data processing of the first module and the second module is set. If it is determined, in operation 510, that information regarding the capacity of the storage space needed for data processing of the first module and the second module is not set, a buffer having a default size is allocated, in operation 520.

If it is determined, in operation 510, that information regarding the capacity of the storage space needed for data processing of the first module and the second module is set, it is determined whether a storage space size corresponding to second capacity information regarding the capacity of a storage space needed for data processing of the second module is greater than a storage space size corresponding to first capacity information regarding the capacity of a storage space needed for data processing of the first module, in operation 530.

If it is determined, in operation 530, that the storage space size corresponding to the second capacity information is greater than the storage space size corresponding to first capacity information, a storage space having the storage space size corresponding to the second capacity information is allocated as the first storage space, in operation 540.

If it is determined, in operation 530, that the storage space size corresponding to the second capacity information is less than the storage space size corresponding to first capacity information, a storage space obtained by adding the storage space size corresponding to the second capacity information and a data size to be output from the first module is allocated as the first storage space, in operation 550.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs). Other examples of storage media may include carrier waves (e.g., transmission through the Internet).

As described above, according to the present invention, by controlling a plurality of modules, sequentially processing data, to share a storage space to be used by the plurality of modules, the storage space can be efficiently managed, thereby increasing the reuse rate of memory and the use efficiency of the storage space.

In addition, by sharing the storage space, even when an arbitrary module outputs burst data, the data can be processed without delay.

In addition, by sharing the storage space and using a circular buffer, the storage space can be used without wasting the storage space.

While this invention has been particularly shown and described with reference to preferred embodiments thereof, it will be understood by one skilled in the art that various changes in form and details may be made therein without departing from the spirit and scope of the invention as defined by the appended claims. The embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of allocating a storage space to be used by a plurality of modules sequentially processing data, the method comprising:
  acquiring first capacity information regarding a capacity of a storage space for data processing of a first module and second capacity information regarding a capacity of a storage space for data processing of a second module that processes data consecutively after the first module; and
  allocating a first storage space for both the first module and the second module based on at least one of the first capacity information and the second capacity information,
  wherein the acquiring further acquires third capacity information regarding a capacity of a storage space for data processing of a third module that processes data consecutively after the second module, the allocating further allocates a second storage space for both the second module and the third module, consecutively after the first storage space based on at least one of the second capacity information and the third capacity information, and the method further comprising, if a capacity of the first storage space is insufficient, expanding the first storage space by using a portion of the second storage space, and if a spare space occurs in the first storage space, expanding the second storage space by using the spare space.

2. The method of claim 1, wherein the allocating comprises, if a storage space size corresponding to the second capacity information is greater than a storage space size corresponding to the first capacity information, allocating a storage space having the storage space size corresponding to the second capacity information as the first storage space.

3. The method of claim 1, further comprising generating at least one of a first pointer pointing to a position in the first storage space in which data to be used by the first module is stored, a second pointer pointing to a position in the first storage space in which data processed by the first module is stored, a third pointer pointing to a position in the first storage space in which data to be used by the second module is stored, and a fourth pointer pointing to a position in the first storage space in which data processed by the second module is stored.

4. The method of claim 1, wherein the storage space is a circular buffer such that, if the first storage space is fully used, data is stored from a beginning of the first storage space.

5. The method of claim 1, wherein the first capacity information is information regarding a size and a number of data output from the first module, and the second capacity information is information regarding a size and a number of data input to the second module.

6. A non-transitory computer readable recording medium storing a computer readable program for executing the method of claim 1.

7. A method of allocating a storage space to be used by a plurality of modules sequentially processing data, the method comprising:

acquiring first capacity information regarding a capacity of a storage space for data processing of a first module and second capacity information regarding a capacity of a storage space for data processing of a second module that processes data consecutively after the first module; and allocating a first storage space for both the first module and the second module based on at least one of the first capacity information and the second capacity information, wherein the allocating comprises, if a storage space size corresponding to the second capacity information is less than a storage space size corresponding to the first capacity information, allocating a storage space obtained by adding the storage space size corresponding to the second capacity information and a data size to be output from the first module as the first storage space.

8. The method of claim 7, further comprising generating at least one of a first pointer pointing to a position in the first storage space in which data to be used by the first module is stored, a second pointer pointing to a position in the first storage space in which data processed by the first module is stored, a third pointer pointing to a position in the first storage space in which data to be used by the second module is stored, and a fourth pointer pointing to a position in the first storage space in which data processed by the second module is stored.

9. The method of claim 7, wherein the storage space is a circular buffer such that, if the first storage space is fully used, data is stored from a beginning of the first storage space.

10. The method of claim 7, wherein the first capacity information is information regarding a size and a number of data output from the first module, and the second capacity information is information regarding a size and a number of data input to the second module.

11. A non-transitory computer readable recording medium storing a computer readable program for executing the method of claim 7.

12. An apparatus for allocating a storage space to be used by a plurality of modules sequentially processing data, the apparatus comprising:

a computer configured to perform the functions of:

an information acquisition unit which acquires first capacity information regarding a capacity of a storage space for data processing of a first module and second capacity information regarding a capacity of a storage space for data processing of a second module that processes data consecutively after the first module; and a storage space allocator which allocates a first storage space for both the first module and the second module based on at least one of the first capacity information and the second capacity information, wherein the information acquisition unit further acquires third capacity information regarding a capacity of a storage space for data processing of a third module that processes data consecutively after the second module, and the storage space allocator further allocates a second storage space for both the second module and the third module, consecutively after the first storage space based on at least one of the second capacity information and the third capacity information, and wherein the computer is further configured to perform the functions of a storage space adjustment unit, which if a capacity of the first storage space is insufficient, expands the first storage space by using a portion of the second storage space, and if a spare space occurs in the first storage space, expands the second storage space by using the spare space.

13. The apparatus of claim 12, wherein if a storage space size corresponding to the second capacity information is greater than a storage space size corresponding to the first capacity information, the storage space allocator allocates a storage space having the storage space size corresponding to the second capacity information as the first storage space.

14. The apparatus of claim 12, wherein the computer is further configured to perform the functions of a pointer generator which generates at least one of a first pointer pointing to a position in the first storage space in which data to be used by the first module is stored, a second pointer pointing to a position in the first storage space in which data processed by the first module is stored, a third pointer pointing to a position in the first storage space in which data to be used by the second module is stored, and a fourth pointer pointing to a position in the first storage space in which data processed by the second module is stored.

15. The apparatus of claim 12, wherein the storage space is a circular buffer such that, if the first storage space is fully used, data is stored from a beginning of the first storage space.

16. The apparatus of claim 12, wherein the first capacity information is information regarding a size and a number of data output from the first module, and the second capacity information is information regarding a size and a number of data input to the second module.

17. An apparatus for allocating a storage space to be used by a plurality of modules sequentially processing data, the apparatus comprising:
- a computer configured to perform the functions of:
- an information acquisition unit which acquires first capacity information regarding a capacity of a storage space for data processing of a first module and second capacity information regarding a capacity of a storage space for data processing of a second module that processes data consecutively after the first module; and
- a storage space allocator which allocates a first storage space for both the first module and the second module based on at least one of the first capacity information and the second capacity information,
- wherein if a storage space size corresponding to the second capacity information is less than a storage space size corresponding to the first capacity information, the storage space allocator allocates a storage space obtained by adding the storage space size corresponding to the second capacity information and a data size to be output from the first module as the first storage space.

18. The apparatus of claim 17, wherein the computer is further configured to perform the functions of a pointer generator which generates at least one of a first pointer pointing to a position in the first storage space in which data to be used by the first module is stored, a second pointer pointing to a position in the first storage space in which data processed by the first module is stored, a third pointer pointing to a position in the first storage space in which data to be used by the second module is stored, and a fourth pointer pointing to a position in the first storage space in which data processed by the second module is stored.

19. The apparatus of claim 17, wherein the storage space is a circular buffer such that, if the first storage space is fully used, data is stored from a beginning of the first storage space.

20. The apparatus of claim 17, wherein the first capacity information is information regarding a size and a number of data output from the first module, and
- the second capacity information is information regarding a size and a number of data input to the second module.

* * * * *